(12) United States Patent
Schmidt et al.

(10) Patent No.: US 10,912,404 B2
(45) Date of Patent: Feb. 9, 2021

(54) ROTARY LOCKING MECHANISM FOR VEHICLE OUTER MIRROR ASSEMBLY

(75) Inventors: William Schmidt, Newport, MI (US); Jack N. Perry, II, Ida, MI (US)

(73) Assignee: ROSCO, INC., Jamaica, NY (US)

( * ) Notice: Subject to any disclaimer, the term of this patent is extended or adjusted under 35 U.S.C. 154(b) by 0 days.

(21) Appl. No.: 10/908,325

(22) Filed: May 6, 2005

(65) Prior Publication Data

US 2006/0250710 A1 Nov. 9, 2006

(51) Int. Cl.
*G02B 7/182* (2006.01)
*A47G 25/14* (2006.01)

(52) U.S. Cl.
CPC .................... *A47G 25/14* (2013.01)

(58) Field of Classification Search
USPC ......... 359/841, 872, 864, 607; 248/481, 479
See application file for complete search history.

(56) References Cited

U.S. PATENT DOCUMENTS

| | | | | | |
|---|---|---|---|---|---|
| 3,384,334 | A | * | 5/1968 | Malachowski | 248/478 |
| 3,433,511 | A | * | 3/1969 | Frankel | 403/96 |
| 4,186,905 | A | * | 2/1980 | Brudy | 248/478 |
| 4,623,115 | A | * | 11/1986 | Brester | 248/479 |
| 5,190,499 | A | * | 3/1993 | Mori et al. | 464/36 |
| 5,949,591 | A | * | 9/1999 | Whitehead | 359/841 |

* cited by examiner

*Primary Examiner* — Stephone B Allen
*Assistant Examiner* — Jennifer L. Doak
(74) *Attorney, Agent, or Firm* — Manatt, Phelps & Phillips, LLP

(57) ABSTRACT

The present invention discloses an adjustable side rear view mirror assembly for attachment to a vehicle. The mirror assembly includes one or more rotary lock mechanisms which allow the mirror assembly to rotate between a series of designated positions. The mirror assembly includes an interlocking "clam-shell" construction for the mirror housing, as well as reflective mirror members which are laminated to surfaces on the mirror housing.

4 Claims, 4 Drawing Sheets

ROTARY LOCKING MECHANISM FOR VEHICLE OUTER MIRROR ASSEMBLY

TECHNICAL FIELD

The present invention relates generally to side-view mirror assemblies for vehicles and more particularly to adjustable mirror assemblies with improved adjustment mechanisms and laminated mirror glass members.

BACKGROUND OF THE INVENTION

Side view mirrors for vehicles, such as automobiles and trucks, are well known. The mirror lenses, mirror housings, and mirror assemblies come in various sizes and shapes. The assemblies typically are adjustable, such as having movable housings and/or movable mirror lenses within housings for better viewing by the vehicle operator, and often are movable toward the vehicle, such as for protection in automatic car washers.

For large vehicles, the mirror housings are often positioned at a considerable distance from the side of the vehicle for better viewing, and the mirror lenses typically are significantly large in size for an increased field of view. The increased size can cause additional difficulties with tight places.

The mirror lenses themselves (e.g. panes of mirrored glass) are typically part of the structure of the housing or susceptible to being broken or shattered rendering them unfit for their original purpose. The adjustment mechanisms for these mirror assemblies also often are not convenient or easy to use and often become too worn or "stripped" such that that the ability to hold the assemblies tightly in position or to provide a steady image are compromised.

Also, typically different mirror assemblies and housings are provided for the left and right sides of vehicles, thus necessitating ordering and stocking two different mirror assemblies.

These problems are more acute if the vehicle is being used for a police or military purpose where it is necessary to have a usable and adjustable mirror assembly which is functional at all times. Also, it is a disadvantage if the mirror lenses are susceptible to being shattered easily and becoming unusable for their intended purpose, or where the broken pieces can become loose becoming a safety hazard for the vehicle operator and/or occupants.

SUMMARY OF THE INVENTION

It is an object of the present invention to provide an improved mirror assembly which overcomes one or more of the disadvantages mentioned above for use on vehicles. It is also an object of the present invention to provide an improved mirror assembly which has particular use for police or military vehicles.

It is a further object of the present invention to provide a mirror assembly which has an improved mechanism for mounting the mirror assembly on a vehicle and for allowing it to be adjusted.

It is a still further object of the present invention to provide a mirror assembly with a mirror lens (e.g. a pane of mirrored glass) which is less susceptible to breaking or shattering, and thus which will maintain its use or function for a longer period of time.

It is an additional object of the present invention to provide a mirror assembly which can be easily adapted for use as a rearview mirror on either the left or right sides of a vehicle.

The present invention overcomes the disadvantages of known side mounted rear view mirror assemblies for automobiles and other vehicles and provides an improved mirror assembly which meets most or all of the above objectives. The mirror assembly in accordance with the present invention has an improved mechanism for mounting the mirror assembly on a vehicle, has an improved mechanism for allowing adjustment of the mirror housing relative to the vehicle, has an improved mechanism for mounting and retaining the mirror lens on the mirror housing, has an improved structure for the mirror housing itself, and has a modular structure which allows usage on either side of a vehicle with minor adjustments.

The mirror housing has a sealed "clam-shell" assembly with at least one flat outer surface for mounting of a mirror lens. The mirror lenses, which can be of any conventional type, such as a pane of mirrored glass, is glued or laminated onto the flat surface. In one preferred embodiment, two lenses are provided on two flat surfaces on the housing.

The housing is attached to a C-shaped mounting frame by bracket members. The bracket members can be mounted on the mounting frame in different orientations in order to allow the housing and mounting frame to be attached to either the left or right sides of a vehicle. The brackets also allow the mirror housing to be adjusted relative to the frame at the discretion of the operator. Fastener members are used to securely hold the bracket members on the mounting frame as desired.

An adjustment mechanism is attached to one or both ends of the mounting frame in order to allow the frame to be movable or adjusted relative to the vehicle. If only one adjustment mechanism is utilized, the other end of the mounting frame preferably has a pivoting or hinge-type mechanism.

The adjustment mechanism preferably is a rotary lock mechanism. The rotary lock mechanism has a pair of disc members which are held together by a fastener member and are rotatable relative to one another. A plurality of biased ball-type members positioned in cavities allow selective rotation of the disc members relative to each other and also secure the disc members at various positions when desired.

One or both of the disc members also preferably has a recessed channel or groove for positioning of mounting bracket members in order to secure the mounting frame to the vehicle. The channel or groove prevents rotation of the mounting bracket members relative to the disc members.

Further details, objects, benefits, and advantages of the present invention are set forth below and/or shown in the drawings.

BRIEF DESCRIPTION OF THE DRAWINGS

The present invention will be described by way of example with reference to the following drawings.

DETAILED DESCRIPTION OF THE PREFERRED EMBODIMENTS

Figure 1:
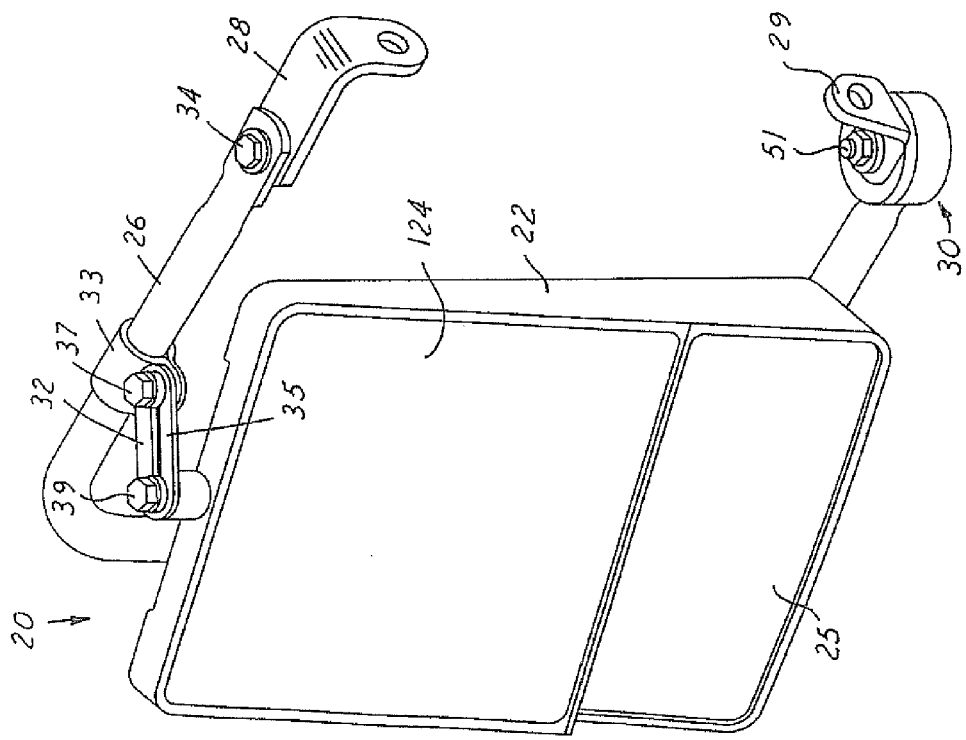
FIG. 1 illustrates a perspective view of the front of a mirror assembly embodiment in accordance with the present invention.

A preferred embodiment of a rear side view mirror assembly of the present invention is shown in FIG. 1 and referred to generally by the reference numeral 20. The mirror assembly 20 is for use on a vehicle, such as an automobile or truck, and is preferably mounted on the side of the vehicle.

Preferably, one mirror assembly 20 is mounted on either side of the vehicle and mounted at a location to be easily viewed by the driver of the vehicle. One preferred use of the present invention is for mounting on military vehicles, such as the HMMWV (a/k/a Humvee").

Figure 2:
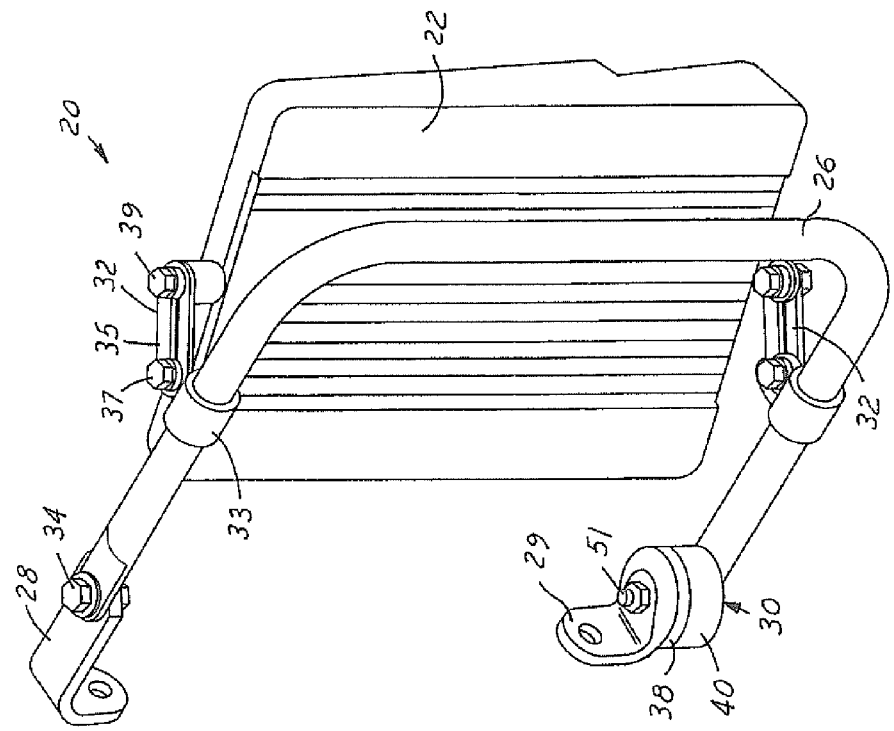
FIG. 2 illustrates a perspective view of the back of a mirror assembly embodiment in accordance with the present invention.

Referring to FIGS. 1 and 2, the mirror assembly 20 includes a housing 22, at least one reflective mirror lens member 24 attached to the housing 22, and a support bracket 26 for supporting the housing 22 on the vehicle. The support bracket 26 is attached to the vehicle at one end by a bracket member 28 and at the other end by a rotary lock mechanism 30 together with bracket member 29.

The housing 22 is attached to the generally "C-shaped" support bracket 26 by a pair of connection bracket mechanisms 32. The bracket mechanisms 32 are adapted to fit on the support bracket such that the orientation of the housing 22 can be reversed for the left and right sides of the vehicle. The connection bracket mechanisms 32 each have a clamping ring 33, a slotted bracket member 35, and a pair of fastener members 37 and 39. As shown in FIG. 2, a pair of connector bracket mechanisms 32 are preferably provided, one on the top of the mirror assembly 20 and one on the bottom of the mirror assembly.

The attachment bracket 28 is generally "L-shaped" and is connected to the support bracket 26 by pivot member 34 which, as shown, can be a conventional nut and bolt fastener mechanism. The pivot member 34 allows the support bracket 26 to rotate relative to the attachment bracket in a manner and for a purpose explained below. Preferably, a nut and bolt fastener or similar fastener mechanism holds the attachment bracket and support bracket relatively tightly together (to prevent undesirable vibrations or movement of the mirror assembly), but still allows the mirror assembly to pivot or rotate when desired.

The rotary lock mechanism 30 rotates between a series of predetermined "locked" positions, allowing the support bracket 26 with the housing 22 and reflective mirror member 24 to rotate through a series of "locked" positions. During normal driving conditions, the support bracket 26 will be situated generally 90° with respect to the side of the vehicle, although the support brackets can be adjusted to various positions according to the driver's needs or desires. The rotary lock mechanism 30 also allows the support bracket 26 as well as the reflective mirror member 24 and housing 22 to be moved into a position against or adjacent the side of the vehicle for storage or to allow movement of the vehicle through tight spaces.

It should be noted that multiple reflective mirror members 24 and 25 could be attached to the housing 22. For example, reflective mirror members 24 and 25 are illustrated in FIGS. 1, 2, 7 and 8, although the invention is not limited to the use of two reflective mirror members.

Also, when two reflective mirror members are provided, one of the mirror members 24 can be a flat mirror providing a standard reflective field of view, while the other mirror member 25 can be a curved (convex) mirror providing an expanded or wider field of view.

Each of the reflective mirror members 24 and 25 preferably comprises a single panel of safety glass that is glued or otherwise securely affixed to the surface of the housing. In this regard, the glue, adhesive tape or other material which is used to affix the mirror members to the housing, is provided across the entire rear surface of the reflective mirror members creating a "laminated" assembly. With such mirror members and with such mirror members laminated to the mirror housing, individual pieces of the reflective mirror members will be retained in place and maintain their usefulness as reflective surfaces even if they are broken or shattered in some manner. Also, with the glue or adhesive material being provided across the entire rear surface of the pane of mirrored glass, each of the individual pieces from a broken or shattered mirror will be retained on the mirror housing and will not be easily dislodged where they could injure the vehicle operator or occupants.

Each of the reflective mirror members utilized with the housing 22 preferably is laminated to one of the surfaces of the mirror housing in the same manner.

Figure 3:
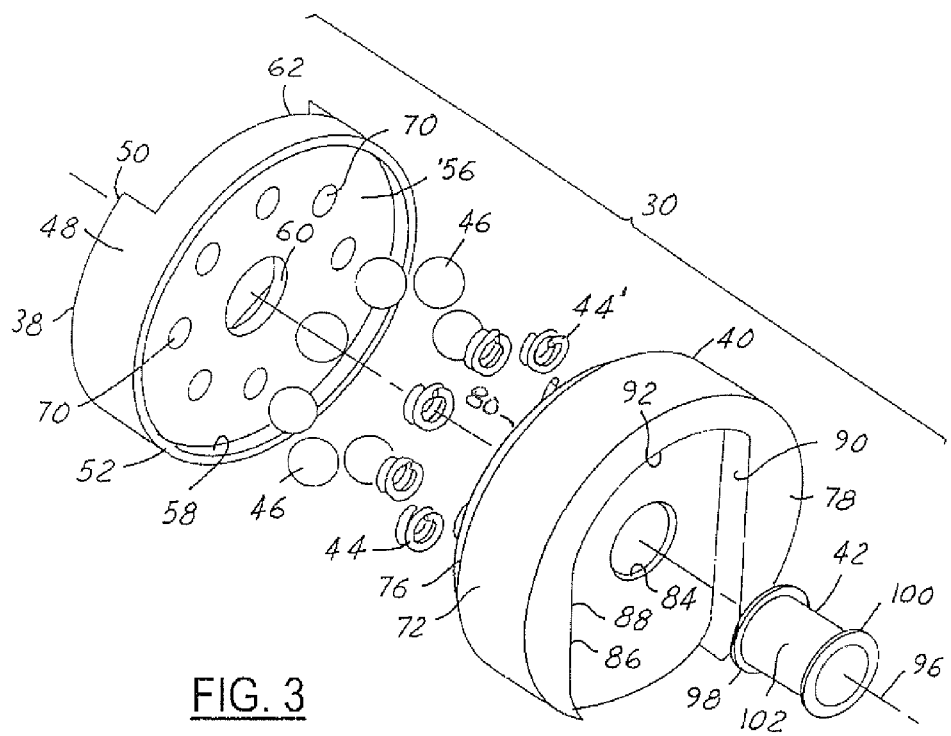
FIG. 3 illustrates an expanded perspective view of an embodiment of a rotary lock mechanism for use with the present invention.
Figure 4A:
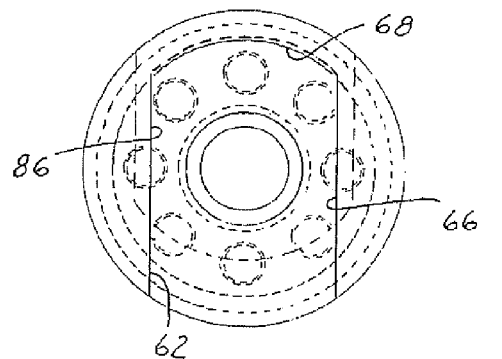
FIGS. 4A and 4B illustrate top and side views, respectively, of the rotary lock mechanism of FIG. 3 with portions shown in hidden lines.
Figure 4B:
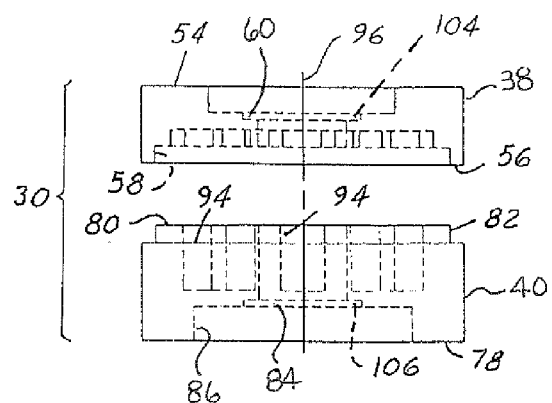

Referring to FIG. 3, the rotary lock mechanism 30 includes a first disc member 38, a second disc member 40, a bushing or sleeve member 42 that helps hold the two disc members together, and a plurality of spring members 44 and ball members 46 that interact with the disc members to allow them to rotate relative to one another and yet be "locked" or secured in various positions.

Although the preferred embodiment shown in FIGS. 1 and 2 utilizes a rotary lock mechanism 30 only at one end of the generally C-shaped frame member 26, it is also possible in accordance with the present invention to provide a rotary lock mechanism at both ends of the frame member 26.

The first disc member 38 has a generally cylindrical shape with an outer wall 48, an exterior end 50 and an interior end 52. The interior end 52 has a recessed surface 56 with an outer ridge member or wall 58. The recess formed on the interior end 52 of disc member 38 is used to receive the interior end 76 of disc member 40.

The first disc member 38 also includes a central aperture 60 extending through the disc member. Further, a first recess or groove 62 is provided in the exterior end 50 of the first disc member 38 for receipt of the attachment bracket 29 for attachment to the vehicle. The shape of the first recess 62 holds the attachment bracket 29 in place with respect to the disc member 38 so that they cannot rotate relative to one another.

The interior surface 56 of the disc member 38 includes a plurality of indentations or small pockets 70 spaced in a circular pattern around the central aperture 60. The indentations 70 have a generally circular shape although they could also have other shapes as desired.

The second disc member 40 also has a curved outer wall member 72, an exterior end 78 and an interior end 76. The interior end 76 contains a raised surface 80 that fits within the recess 56 formed in the first disc member 38. The raised surface 80 defines a protrusion 82 that is received within the recess thereby forming the rotary lock housing when the two disc members 38 and 40 are assembled together.

The second disc member 40 also includes a central aperture 84 extending from one side to the other and in axial alignment with the aperture 60 on the first disc member. The exterior surface 78 also includes a second recess 86 for receipt of a support bracket. Similar to recess 62, the recess 86 prevents the support bracket from rotating relative to the disc member 40. The interior surface 80 of the second disc member 40 includes multiple cavities or blind-holes 94 spaced in an annular configuration around the central aperture 84. In this regard, the cavities 94 in the second disc member and the indentations 70 in the first disc member are in axial alignment. Preferably, the same number of cavities 94 and indentations 70 are provided.

A plurality of spring members 44 are provided, one in each of the cavities 94 in the second disc member 40. In addition, a corresponding number of ball members 46 are provided and positioned between the two disc members 38, 40. The spring members which preferably are small coil spring members bias the ball members into engagement with the indentations 70 in the first disc member. The cavities 94 have a diameter that is larger than the diameter of the ball members 46 such that the ball members can fit full or partially within the cavities (see FIG. 6) when one disc member is rotated relative to the other disc member.

A sleeve member 42 is positioned in the aligned apertures 60 and 84. The sleeve member 42 preferably has flanges or collars 98, 100 at one or both ends although the same function could be provided by washers. The flanges or washers can be positioned in recesses 104 and 106. A nut and bolt fastener member 51 or other conventional fastener is used to hold the first and second disc members together. The fastener member 51 is positioned in the hollow center 53 of the sleeve member 42.

Preferably, the first and second disc members 38, 40 are made from a plastic material, although they could also be made of another material which is sufficiently durable to be used for the intended purpose of the rotary lock mechanism 30. The sleeve member 42 is preferably a metal material, such as brass or the like. The spring members 44 and ball members 46 are preferably made of a metal material, and the ball members could be ball bearings or the like.

The sleeve member 42 holds the two disc members 38 and 40 together and also allows them to rotate relative to one another around a central axis 96.

One spring member 44 is positioned in each cavity 94 in the second disc member 40. One ball member 46 is then positioned in each cavity resting on a spring member.

Figure 5:
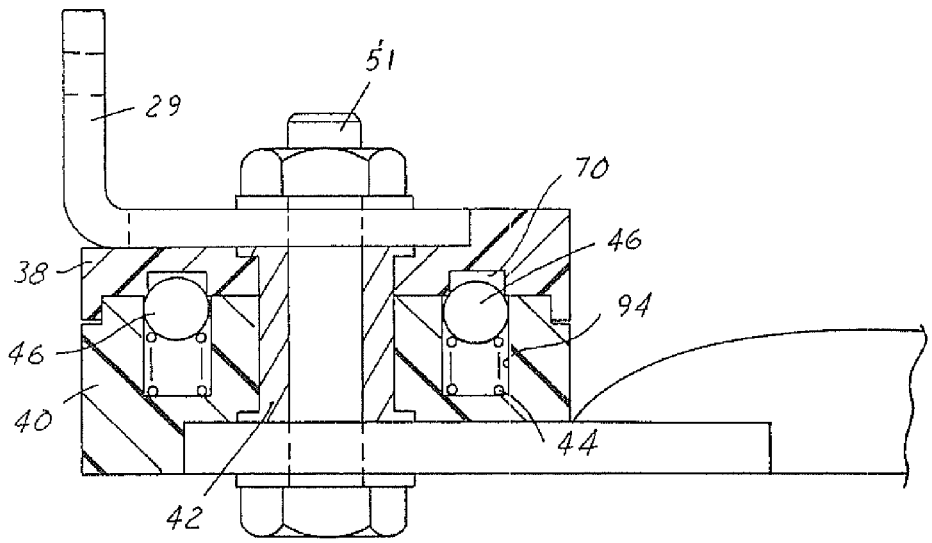
FIG. 5 illustrates a partially cut-away side view of the rotary lock mechanism of FIG. 3 in a locked or secured position.
Figure 6:
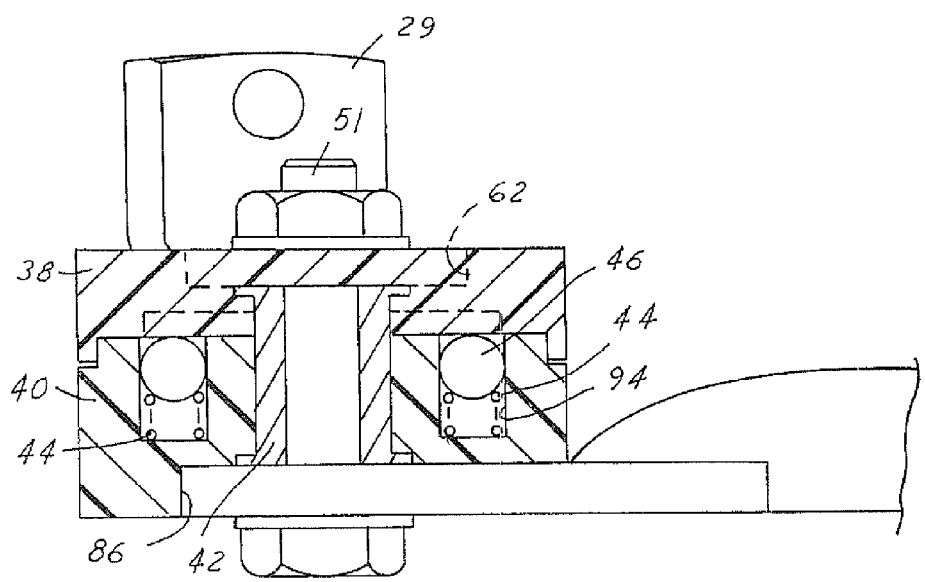
FIG. 6 illustrates a partially cut-away side view of the rotary lock mechanism of FIG. 3 in an unlocked or rotational position.

The rotary lock mechanism 30 moves between a series of "locked" positions, as illustrated in FIG. 5. While moving between the locked positions, the assembly 30 moves to intermediate or unlocked positions, as illustrated in FIG. 6. To facilitate moving from one of the locked positions to another locked position, the two disc members are rotated relative to one another. In this regard, in the embodiment shown in FIGS. 1 and 2, the first disc member 38 would be held stationary while the second disc member 40 would be rotated relative thereto. The first disc member 38 is held stationary because it is attached to the attachment bracket 29 that in turn is connected to a vehicle.

During travel from a first locked position to a second locked position, the two disc members 38, 40 rotate relative to one another forcing each of the ball members 46 out of its position in an indentation 70 and to a position where it is fully positioned within a cavity 94. In this position, as shown in FIG. 6, the spring members 44 are compressed. In this regard, it should be noted that the disc members 38 and 40 can rotate either in a clockwise or counterclockwise direction. During the intermediate position, each of the ball members 46 remains within its associated cavity 94 until the next indentation 70 becomes aligned with the cavity. When the next indentation 70 aligns with a respective cavity 94, the spring members 94 expand forcing the associate ball members into the indentation 70, thereby "locking" the rotary lock mechanism or assembly 30 into another locked position. This process can continue until the mirror assembly 20 has reached a desired location relative to the vehicle as desired by the operator or occupants.

As indicated, in an alternative embodiment, there can be two rotary lock assemblies provided, one at each end of the C-shape support bracket member 26. Also, the orientation of the rotary lock assembly is irrelevant. In other words, the first disc member can be mounted to the mirror assembly support bracket and the second disc member can be mounted to an attachment bracket without changing the purpose or function of the retractable mirror assembly.

With the rotary lock mechanism and either a pair of rotary lock mechanisms or one rotary lock mechanism and an associated hinge mechanism 34, the present invention allows the entire mirror assembly 20 to be rotated to a position flush with or immediately adjacent to the side of the vehicle. This prevents the mirror assembly from being damaged if the vehicle is proceeding through confined spaces.

With the present invention, a rear side view mirror is provided for an automobile or other vehicle which is adjustable in many ways, as well as having a structure and configuration which allows use on either side of the vehicle. As for adjustability, the mirror housing 22 can be adjusted in orientation relative to the C-support frame member 26 by loosening the fastener members 37 and 39 and the bracket members 32. In addition, the entire C-shaped support member 26 can be rotated or adjusted relative to the side of the vehicle due to the rotary lock mechanism 30 and the hinge mechanism 34.

It is possible to provide any number of sets of indentations, cavities, ball members and spring members as desired. The greater the number of sets are provided, the more positions which the rotary lock mechanism can be "locked" or secured.

Figure 7:
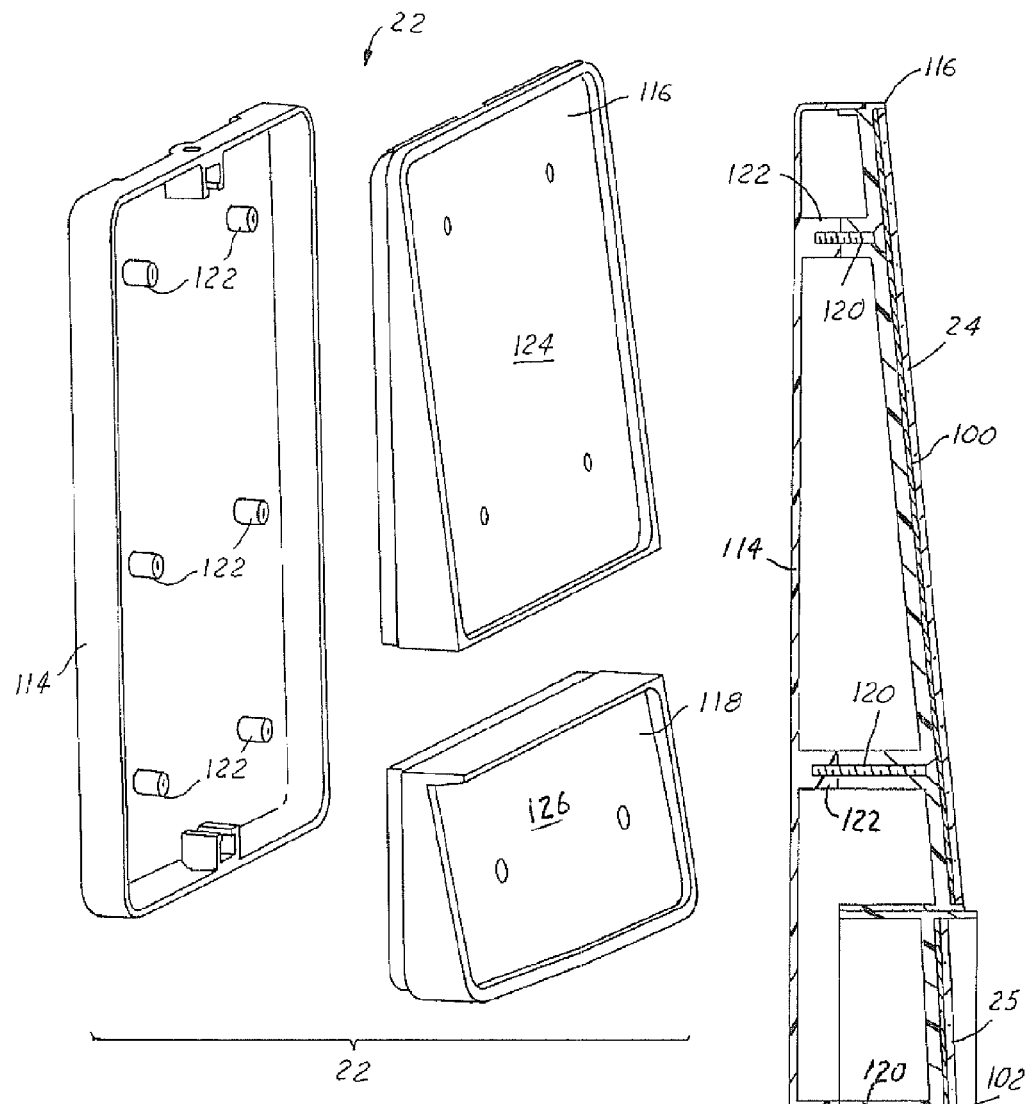
FIG. 7 illustrates and exploded perspective view of an embodiment of a "clam-shell" type mirror housing for use with the present invention.
Figure 8:
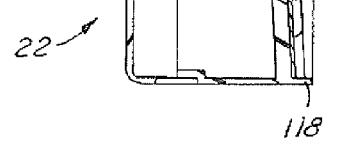
FIG. 8 illustrates a cross-sectional side view of the assembled mirror housing depicted in FIG. 7, together with mirrored lens members.

The mirror housing 22 also preferably has an interlocking "clam-shell" construction. This is shown in FIGS. 7 and 8. The mirror housing 22 includes a rear member 114 and one or two front members 116 and 118. All of the members 114, 116, 118 are preferably made of a plastic material, although other conventional materials could be utilized. The housing members 114, 116 and 118 are formed with interlocking pin and socket members 120 and 122. The "clam-shell" construction allows easy manufacture and assembly of the mirror housing 22 and provides a structure which is durable and which has sufficient strength and rigidity for its intended use.

The front mirror housings 116 and 118 have flat surfaces 124 and 126, respectively, that are used to position and retain panes of mirrored glass members 24 and 25 respectively.

The two surfaces 124 and 126 allow the respective mirror members to be positioned in independent angles relative to each other to provide maximum visibility, as well as allow different types of lenses (e.g. flat and convex) to be utilized for different fields of view.

The reflective mirror members 24 and 25 are preferably panes of mirrored glass. They also are glued or otherwise securely affixed by tape, glue, or other methods across the entire rear surfaces thereof. This will prevent individual pieces of the reflective mirror members 24 and 25 from being dislodged or becoming projectiles in the event that the mirrored glass members are broken or shattered. The securing of the mirrored glass members across the entire flat surfaces of the housing provides a "laminated" structure or assembly.

Also, by gluing or otherwise securing the individual panes of mirrored glass onto surfaces of the housing, the mirror members are not part of the structural integrity of the housing 22 as is common in many mirror assemblies or housings. This provides added security for the mirrored glass members and prevents them from being broken or shattered as easily.

What is claimed is:

1. An adjustable mirror assembly for mounting on a vehicle comprising:
   a support bracket member having a first end and a second end;
   at least one reflective mirror member secured to said supporting bracket member;
   a first attaching member rotatably attached to said first end of said bracket member;
   a rotating locking mechanism attached to said second end of said support bracket member; said rotary locking mechanism comprising a housing comprised of a first housing member with a first outer surface and a first inner surface and a second housing member with a second outer surface and a second inner surface; and
   a second attachment bracket member attached to said rotary locking mechanism for connecting to a vehicle;
   said first outer surface and said second outer surface being substantially parallel to one another, and said first inner surface and said second inner surface being substantially parallel to one another;
   said rotating locking mechanism comprising a socket and ball mechanism and being positioned in said housing between said first inner surface and said second inner surface;
   said rotating locking mechanism having a first elongated recess in said first outer surface for positioning of said second attachment bracket member, said first elongated recess preventing relative movement between said second attachment bracket member and said first housing member;
   said rotating locking mechanism having a second elongated recess in said second outer surface for fixedly positioning said second end of said support bracket member, said second elongated recess preventing relative movement between said support bracket member and said second housing member.

2. An adjustable mirror assembly for mounting on a vehicle comprising:
   a support bracket member having a first end and a second end;
   at least one reflective mirror member secured to said support bracket member;
   a first attachment member rotatably attached to said first end of said bracket member;
   a rotary locking mechanism attached to said second end of said support bracket member, said rotary locking mechanism comprising a housing comprised of a first housing member with a first outer surface and a second housing member with a second outer surface; and
   a second attachment member attached to said rotary locking mechanism for connecting to a vehicle;
   said first housing member having a first outer surface and said second housing member having a second outer surface, said first and second outer surfaces being substantially parallel to one another;
   said rotary locking mechanism comprising a socket and ball mechanism and being positioned between said first and second housing members, said rotary locking mechanism allowing relative rotational movement between said first housing member and said second housing member between a plurality of locking positions:
   said rotating locking mechanism having a first elongated recess in said first outer surface for positioning of either said second attachment member or said second end of said support bracket member, said first elongated recess fixing either of said second attachment member or said second end of said support bracket member in a single position relative to said first housing member while said first housing member and said second housing member are moved between said plurality of locking positions.

3. An adjustable mirror assembly as described in claim 2 further comprising a second elongated recess in said second surface for fixedly positioning the other of said second attachment member or said second end of said support bracket member.

4. An adjustable mirror assembly for mounting on a vehicle comprising:
   a support bracket member having a first end and a second end;
   at least one reflective mirror member secured to said supporting bracket member;
   a first attaching member rotatably attached to said first end of said bracket member;
   a rotating locking mechanism attached to said second end of said support bracket member; said rotary locking mechanism comprising a housing comprised of a first housing member with a first outer surface and a first inner surface and a second housing member with a second outer surface and a second inner surface; and
   a second attachment bracket member attached to said rotary locking mechanism for connecting to a vehicle;
   said first outer surface and said second outer surface being substantially parallel to one another, and said first inner surface and said second inner surface being substantially parallel to one another;
   said rotating locking mechanism comprising a socket and ball mechanism and being positioned in said housing between said first inner surface and said second inner surface such that said first housing member and said second housing member can be rotated relative to one another between a plurality of locking positions;
   said rotating locking mechanism having a first elongated recess in said first outer surface for fixedly engaging said second attachment bracket member to prevent relative rotation there between;
   said rotating locking mechanism having a second elongated recess in said second outer surface for fixedly engaging said second end of said support bracket member to prevent relative rotation there between.

* * * * *